(12) United States Patent
Aga et al.

(10) Patent No.: US 8,884,588 B2
(45) Date of Patent: Nov. 11, 2014

(54) BATTERY WARMING CIRCUIT AND BATTERY WARMING APPARATUS

(75) Inventors: Etsushi Aga, Osaka (JP); Naohisa Morimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 235 days.

(21) Appl. No.: 13/512,275

(22) PCT Filed: Jul. 11, 2011

(86) PCT No.: PCT/JP2011/003958
§ 371 (c)(1),
(2), (4) Date: May 25, 2012

(87) PCT Pub. No.: WO2012/014392
PCT Pub. Date: Feb. 2, 2012

(65) Prior Publication Data
US 2012/0280660 A1 Nov. 8, 2012

(30) Foreign Application Priority Data
Jul. 29, 2010 (JP) ................. 2010-170903

(51) Int. Cl.
*H02J 7/00* (2006.01)
*H01M 10/615* (2014.01)
*H01M 10/63* (2014.01)
*B60L 11/18* (2006.01)
*H01M 10/657* (2014.01)
*H01M 10/625* (2014.01)
*H01M 10/48* (2006.01)

(52) U.S. Cl.
CPC ....... *B60L 11/1875* (2013.01); *H01M 10/5006* (2013.01); *H01M 10/502* (2013.01); *Y02T 10/7005* (2013.01); *B60L 11/1872* (2013.01); *B60L 2250/20* (2013.01); *B60L 11/1803* (2013.01); *B60L 2240/545* (2013.01); *H01M 10/5081* (2013.01); *B60L 2240/662* (2013.01); *H01M 10/486* (2013.01); *Y02E 60/12* (2013.01); *Y02T 10/705* (2013.01); *Y02T 90/16* (2013.01); *H01M 10/5016* (2013.01)
USPC ............................ 320/136; 320/134; 320/104

(58) Field of Classification Search
USPC ......... 320/104, 134, 136, 150, 152; 307/10.1; 180/207.3
See application file for complete search history.

(56) References Cited

U.S. PATENT DOCUMENTS 5,612,599 A * 3/1997 Itami et al. ............... 318/400.27
7,629,755 B2 12/2009 Yaguchi
(Continued)

FOREIGN PATENT DOCUMENTS

CN 101223685 A 7/2008
EP 1 903 670 A1 3/2008
(Continued)

OTHER PUBLICATIONS
International Search Report issued in International Patent Application No. PCT/JP2011/003958, mailed Oct. 18, 2011.

*Primary Examiner* — Richard V Muralidar
*Assistant Examiner* — David Henze-Gongola
(74) *Attorney, Agent, or Firm* — McDermott Will & Emery LLP

(57) ABSTRACT

A battery warming circuit is a circuit installed in a vehicle provided with an inverter circuit, which is supplied with direct current electrical power from a secondary battery, and a 3-phase alternating current motor, and this circuit includes: a switch control unit, which has first and second terminals connected to control terminals of first and second switching elements, and controls turning the first and second switching elements on and off; an accumulation unit which has a third terminal connected to the other end of a specific coil, and accumulates back electromotive force generated in the specific coil by turning the second switching element on and off, with the first switching element being turned on; and a charging control unit which is provided between the positive electrode of the secondary battery and the accumulation unit, and supplies electrical power accumulated in the accumulation unit to the secondary battery.

8 Claims, 6 Drawing Sheets

(56) References Cited

U.S. PATENT DOCUMENTS

2003/0231005 A1 12/2003 Kohama et al.
2008/0143281 A1 6/2008 Yaguchi

FOREIGN PATENT DOCUMENTS

| | | |
|---|---|---|
| JP | 11-026032 | 1/1999 |
| JP | 11-026032 A | 1/1999 |
| JP | 2003-272712 | 9/2003 |
| JP | 2007-026700 | 2/2007 |
| JP | 2007-026700 A | 2/2007 |
| JP | 2009-142069 | 6/2009 |
| JP | 2009-142069 A | 6/2009 |
| JP | 2010-052450 | 3/2010 |
| JP | 2010-052450 A | 3/2010 |
| JP | 2010-111290 | 5/2010 |
| JP | 2010-111290 A | 5/2010 |
| JP | 2011-076927 | 4/2011 |
| JP | 2011-076927 A | 4/2011 |
| WO | WO 2007/007900 A1 | 1/2007 |

* cited by examiner

BATTERY WARMING CIRCUIT AND BATTERY WARMING APPARATUS

RELATED APPLICATIONS

This application is the U.S. National Phase under 35 U.S.C. §371 of International Application No. PCT/JP2011/003958, filed on Jul. 11, 2011, which in turn claims the benefit of Japanese Application No. 2010-170903, filed on Jul. 29, 2010, the disclosures of which Applications are incorporated by reference herein.

TECHNICAL FIELD

The present invention relates to a battery warming circuit and a battery warming apparatus that are installed in a vehicle and raise the temperature of a secondary battery.

BACKGROUND ART

In a hybrid vehicle equipped with a generator driven by the engine and a motor for operating the vehicle, for example, the motor is driven by electrical power from a rechargeable secondary battery. Here, the electrical power able to be input to and output from the secondary battery greatly influences the driving performance of the vehicle. If the temperature of the secondary battery falls, the electrical power able to be input to and output from the secondary battery ends up decreasing considerably. Therefore, it has been previously proposed to inhibit decreases in input and output electrical power by raising the temperature of the secondary battery (see, for example, Patent Document 1). In the device described in this Patent Document 1, when the temperature of a secondary battery falls to a prescribed temperature or lower, a secondary battery is charged by driving of a generator by the engine and by regenerative braking while driving, and accordingly, charging and discharging of the secondary battery is repeated to raise the temperature of the secondary battery, thereby inhibiting decreases in input and output electrical power.

However, in the device described in Patent Document 1 described above, regenerative braking while driving and driving of a generator by the engine are always required to charge the secondary battery. In other words, it is necessary to drive the engine in order to raise the temperature of the secondary battery while parked.

Patent Document 1: Japanese Patent Application Laid-open No. 2003-272712

SUMMARY OF THE INVENTION

With the foregoing in view, an object of the present invention is to provide a battery warming circuit and a battery warming apparatus that are able to warm a secondary battery without relying upon regenerative braking while driving or driving of a generator by the engine.

A battery warming circuit installed in a vehicle which is provided with an inverter circuit that converts direct current electrical power supplied from a secondary battery to 3-phase alternating current electrical power by switching a plurality of switching elements on and off, and a 3-phase alternating current motor that is driven by the inverter circuit, the battery warming circuit having: when one phase coil of three phase coils provided in the 3-phase alternating current motor is defined as a specific coil, one of the plurality of switching elements that is connected between one end of the specific coil and a positive electrode of the secondary battery is defined as a first switching element, and one of the plurality of switching elements that is connected between the other end of the specific coil and a negative electrode of the secondary battery is defined as a second switching element, a switch control unit which has a first terminal connected to a control terminal of the first switching element and a second terminal connected to a control terminal of the second switching element, and controls on-off switching of the first and second switching elements by respectively outputting control signals to the control terminals of the first and second switching elements through the first and second terminals; an accumulation unit which has a third terminal connected to the other end of the specific coil, and accumulates back electromotive force generated in the specific coil by switching the second switching element on and off, with the first switching element being turned on; and a charging control unit which is provided between the positive electrode of the secondary battery and the accumulation unit, and supplies electrical power accumulated in the accumulation unit to the secondary battery.

DESCRIPTION OF EMBODIMENTS

The following provides a description of embodiments of the present invention with reference to the drawings.

(First Embodiment)

Figure 1:
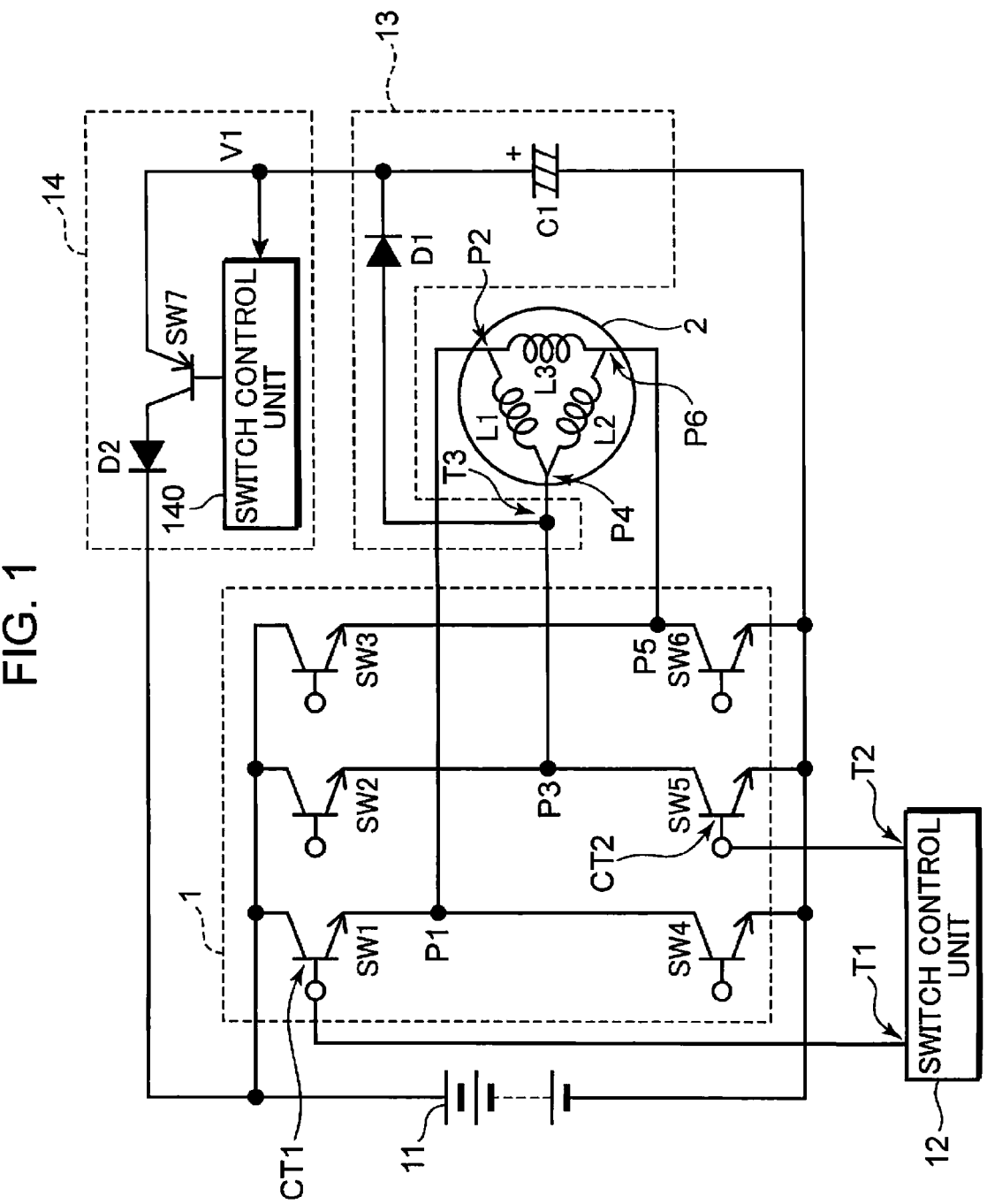
FIG. 1 is a circuit diagram showing the configuration of a vehicle equipped with a battery warming circuit of a first embodiment of the present invention.

FIG. 1 is a circuit diagram showing the configuration of a vehicle equipped with a battery warming circuit of a first embodiment of the present invention. This battery warming circuit is installed in a vehicle provided with an inverter circuit 1, which is supplied with direct current electrical power from a secondary battery 11, and a 3-phase alternating current motor 2, and is provided with a switch control unit 12, an accumulation unit 13 and a charging control unit 14.

The inverter circuit 1 is provided with six switching elements SW1 to SW6, and three phase coils L1 to L3 are provided in the 3-phase alternating current motor 2. More specifically, each of switching elements SW1 and SW4, switching elements SW2 and SW5 and switching elements SW3 and SW6 are connected in series between a positive electrode and a negative electrode of the secondary battery 11. In addition, a connection point P1 between the switching element SW1 and the switching element SW4 is connected to a connection point P2 (one end of the coil L1) between the coil L1 and the coil L3. In addition, a connection point P3 between the switching element SW2 and the switching element SW5 is connected to a connection point P4 (other end of the coil L1) between the coil L1 and the coil L2. In addition, a connection point P5 between the switching element SW3 and the switching element SW6 is connected to a connection point P6 between the coil L2 and the coil L3. As a result of employing this circuit configuration, the inverter circuit 1 converts direct current electrical power supplied from the secondary battery 11 to 3-phase alternating current electrical power by switching the six switching elements SW1 to SW6 on and off. The 3-phase alternating current motor 2 is then driven by this inverter circuit 1.

The switch control unit 12 is composed of, for example, a CPU (Central Processing Unit), a ROM (Read Only Memory), a RAM (Random Access Memory), and the like. The switch control unit 12 is provided with a terminal T1 connected to a control terminal CT1 (base in FIG. 1) for switching the switching element SW1 on and off, and a terminal T2 connected to a control terminal CT2 (base in FIG. 1) for switching the switching element SW5 on and off, and controls turning the switching elements SW1 and SW5 on and off by outputting control signals from the terminals T1 and T2 to the control terminals CT1 and CT2.

The accumulation unit 13 is provided with a terminal T3 connected to the connection point P4 (other end of the coil L1) between the coil L1 and the coil L2, a diode D1 for preventing reverse current, and a capacitor C1 for accumulating electrical power. The anode of the diode D1 is connected to the terminal T3, and the capacitor C1 is connected between the cathode of the diode D1 and the negative electrode of the secondary battery 11.

The charging control unit 14 is provided with a switch element SW7, a diode D2 for preventing reverse current, and a switch control unit 140. The cathode of the diode D2 is connected to the positive electrode of the secondary battery 11, and the anode of the diode D2 is connected to the capacitor C1 through the switch element SW7. The switch control unit 140 is composed of, for example, a CPU (Central Processing Unit), a ROM (Read Only Memory), a RAM (Random Access Memory), and the like. The switch control unit 140 detects a voltage V1 of the capacitor C1, and when the detected voltage V1 becomes equal to or greater than a set level which is set in advance, the switch control unit 140 switches the switch element SW7 from off to on and begins to supply electrical power accumulated in the capacitor C1 to the secondary battery 11. Furthermore, the switch control unit 12 and the switch control unit 140 may also be composed of a single CPU, ROM, RAM and the like.

The following provides a description of the operation of the battery warming circuit configured in the manner described above. When the switching elements SW1 and SW5 are turned on by the switch control unit 12, electrical power is supplied from the secondary battery 11 and current flows to the coil L1 (equivalent to the "specific coil" of the present invention). In other words, discharge current flows in the secondary battery 11. On the other hand, when the switching element SW5 is switched from on to off by the switch control unit 12 with the switching element SW1 being turned on, a back electromotive force is generated in the other end P4 of the coil L1 and the capacitor C1 is charged by this back electromotive force.

When the switching element SW5 is repeatedly turned on and off by the switch control unit 12 while the switching element SW1 is in the on state, in addition to discharge current intermittently flowing in the secondary battery 11, back electromotive force generated in the other end P4 of the coil L1 is accumulated in the capacitor C1 and the voltage V1 of the capacitor C1 rises. When the voltage V1 of the capacitor C1 becomes equal to or greater than the set level, the switch element SW7 is switched from off to on by the switch control unit 140 and electrical power accumulated in the capacitor C1 is supplied to the secondary battery 11. In other words, charge current flows in the secondary battery 11.

Subsequently, when a preset amount of time has elapsed from the time the switch element SW7 has been switched on, or when the detected voltage V1 has decreased to a prescribed level, for example, the switch control unit 140 turns the switch element SW7 back to the off state. The switch control unit 12 and the switch control unit 140 repeat the procedure described above a preset number of times, for example. Alternatively, the switch control unit 12 and the switch control unit 140 may continue the procedure described above for a preset amount of time.

As a result of the above-described operation, charge-discharge current flows in the secondary battery 11. Since Joule heat is generated due to internal resistance of the secondary battery 11 by this charge-discharge current, the temperature of the secondary battery 11 is raised by this Joule heat.

As has been described above, according to this first embodiment, the switching elements SW1 and SW5 are turned on and off, the secondary battery 11 discharges as a result of current flowing to the coil L1 when the switching elements SW1 and SW5 are on. On the other hand, back electromotive force generated in the coil L1, when the switching element SW5 is switched from on to off while the switching element SW1 is in the on state, is accumulated in the capacitor C1, electrical power accumulated in the capacitor C1 is supplied to the secondary battery 11, and the secondary battery 11 is charged. In this manner, since Joule heat is generated due to the internal resistance of the secondary battery 11 by charge-discharge current flowing in the secondary battery 11, the temperature of the secondary battery 11 can be raised by this Joule heat. Moreover, since current only flows to one phase coil L1 of the three phase coils L1 to L3 provided in the 3-phase alternating current motor 2, the 3-phase alternating current motor 2 is not driven. Thus, the secondary battery 11 can be warmed without having to drive the vehicle engine or the 3-phase alternating current motor 2.

In addition, according to the first embodiment, as a result of using the inverter circuit 1 and the 3-phase alternating current motor 2 installed in a vehicle, the secondary battery 11 can be warmed using a simple configuration that does not increase the number of parts. In addition, according to the first embodiment, since Joule heat generated by the internal resistance of the secondary battery 11 is used instead of heating with a heater from the outside, the temperature of the secondary battery 11 can be raised both reliably and efficiently.

(Second Embodiment)

Figure 2:
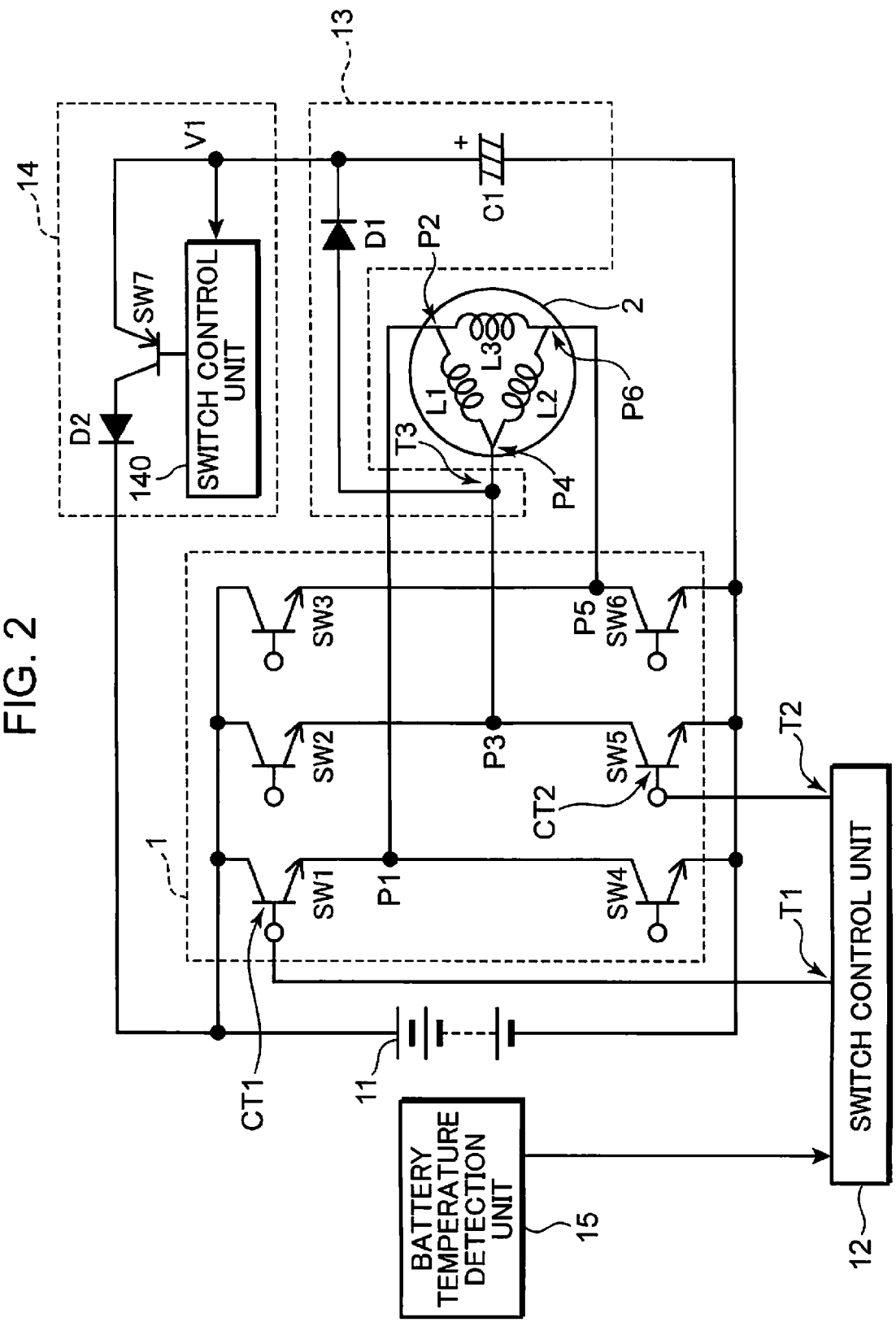
FIG. 2 is a circuit diagram showing the configuration of a vehicle equipped with a battery warming circuit of a second embodiment of the present invention.

FIG. 2 is a circuit diagram showing the configuration of a vehicle equipped with a battery warming circuit of a second embodiment of the present invention. Furthermore, the same reference symbols are used to indicate those constituents of the second embodiment that are the same as those of the first embodiment, and the description focuses only on those constituents that differ from the first embodiment.

The battery warming circuit of the second embodiment is further provided with a battery temperature detection unit 15. The battery temperature detection unit 15 detects the temperature of the secondary battery 11 and notifies the detection results to the switch control unit 12. In addition, the switch control unit 12 starts the operation of turning the switching elements SW1 and SW5 on and off when the temperature of the secondary battery 11 detected by the battery temperature detection unit 15 has fallen to or below a set temperature which is set in advance.

As has been described above, according to the second embodiment, the switch control unit 12 starts the operation of turning the switching elements SW1 and SW5 on and off when the temperature of the secondary battery 11 detected by the battery temperature detection unit 15 has fallen to or below a set temperature which is set in advance. Thus, there is the advantage that the switching elements SW1 and SW5 are operated only when it is necessary to raise the temperature of the secondary battery 11.

(Third Embodiment)

Figure 3:
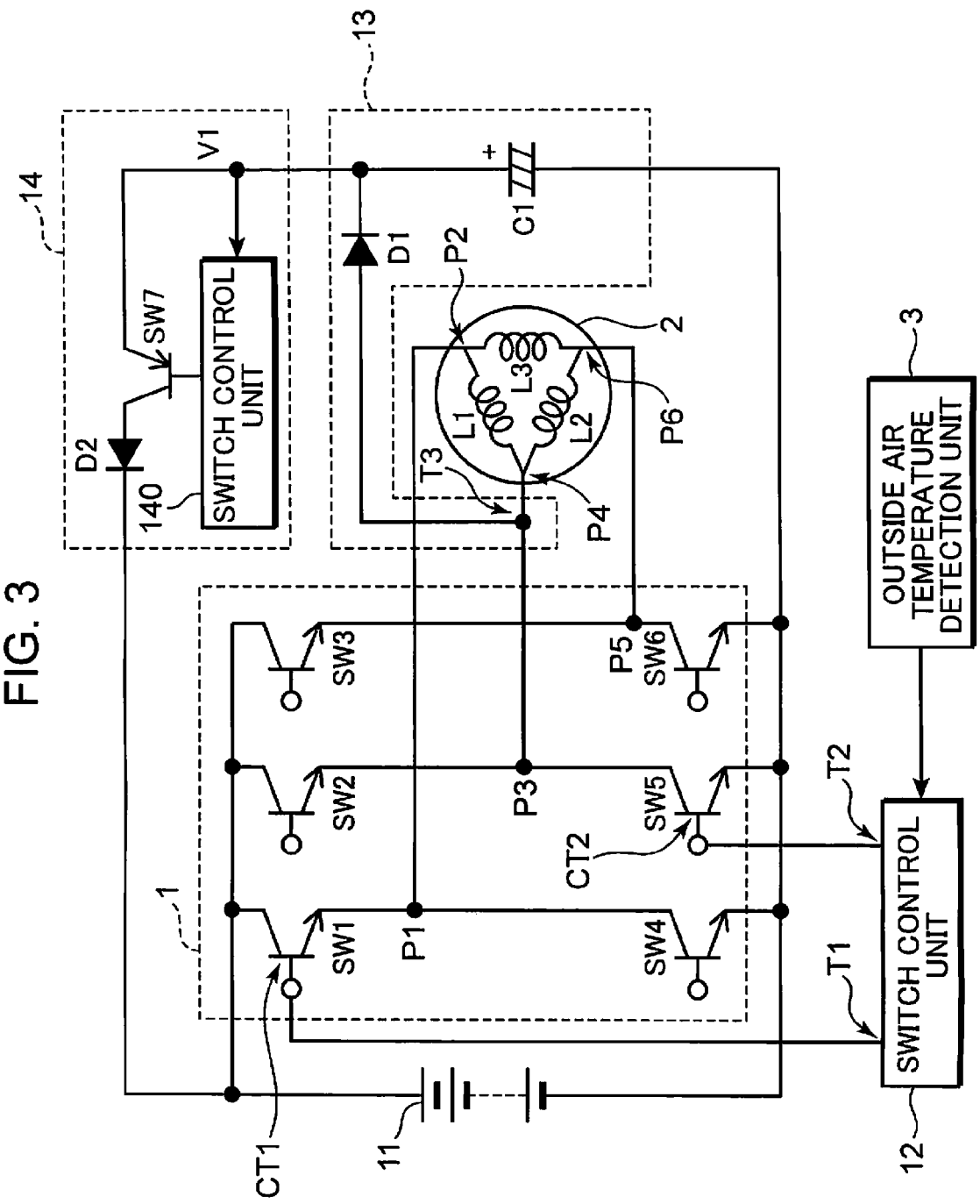
FIG. 3 is a circuit diagram showing the configuration of a vehicle equipped with a battery warming circuit of a third embodiment of the present invention.

FIG. 3 is a circuit diagram showing the configuration of a vehicle equipped with a battery warming circuit of a third embodiment of the present invention. Furthermore, the same reference symbols are used to indicate those constituents of the third embodiment that are the same as those of the first embodiment, and the description focuses only on those constituents that differ from the first embodiment.

A vehicle installed with the battery warming circuit of the third embodiment is equipped with an outside air temperature detection unit 3, which detects the temperature of air outside the vehicle, in addition to the inverter circuit 1 and the 3-phase alternating current motor 2. In addition, in the third embodiment, the switch control unit 12 is electrically connected to the outside air temperature detection unit 3 installed in the vehicle, and starts the operation of turning the switching elements SW1 and SW5 on and off when the outside air temperature detected by the outside air temperature detection unit 3 has fallen to or below a set temperature which is set in advance.

As has been described above, in this third embodiment, the switch control unit 12 starts the operation of turning the switching elements SW1 and SW5 on and off when the outside air temperature detected by the outside air temperature detection unit 3 has fallen to or below a set temperature. Here, the temperature of the secondary battery 11 also decreases when the outside air temperature is low. Hence, according to the third embodiment, there is the advantage that the switching elements SW1 and SW5 are operated only when it is necessary to raise the temperature of the secondary battery 11.

(Fourth Embodiment)

Figure 4:
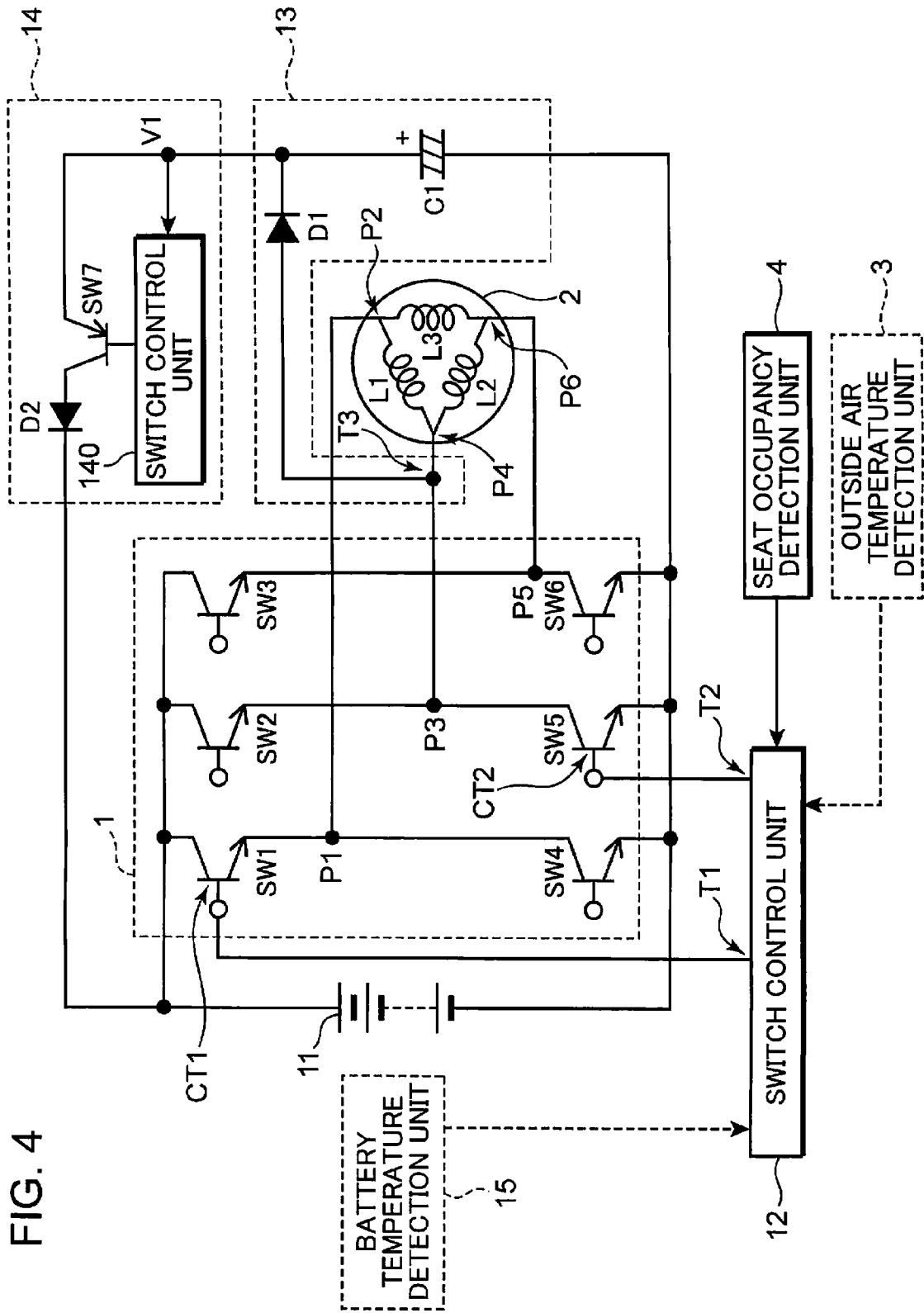
FIG. 4 is a circuit diagram showing the configuration of a vehicle equipped with a battery warming circuit of a fourth embodiment of the present invention.

FIG. 4 is a circuit diagram showing the configuration of a vehicle equipped with a battery warming circuit of a fourth embodiment of the present invention. Furthermore, the same reference symbols are used to indicate those constituents of the fourth embodiment that are the same as those of the first embodiment, and the description focuses only on those constituents that differ from the first embodiment.

A vehicle installed with the battery warming circuit of the fourth embodiment is equipped with a seat occupancy detection unit 4, which detects that a person has sat in a driver's seat, in addition to the inverter circuit 1 and the 3-phase alternating current motor 2. Further, in the fourth embodiment, the switch control unit 12 is electrically connected to the seat occupancy detection unit 4 installed in the vehicle, and starts the operation of turning the switching elements SW1 and SW5 on and off when detection has been made by the seat occupancy detection unit 4 that a person has sat in the driver's seat.

As has been described above, according to this fourth embodiment, the switch control unit 12 starts the operation of turning the switching elements SW1 and SW5 on and off when a person has been detected to have sat in the driver's seat by the seat occupancy detection unit 4. Here, there is a high likelihood of the vehicle being used when a person sits in the driver's seat. Hence, according to this fourth embodiment, there is the advantage that the switching elements SW1 and SW5 are operated only when there is a high likelihood of the vehicle being used.

Furthermore, as indicated by a broken line in FIG. 4, a temperature detected by the outside air temperature detection unit 3 installed in the vehicle may also be used. Namely, the switch control unit 12 may be made to start the operation of turning the switching elements SW1 and SW5 on and off when the outside air temperature detected by the outside air temperature detection unit 3 has fallen to or below a set temperature and when a person has been detected to have sat in the driver's seat by the seat occupancy detection unit 4. In addition, as indicated by a broken line in FIG. 4, a temperature detected by the battery temperature detection unit 15 may also be used. Namely, the switch control unit 12 may be made to start the operation of turning the switching elements SW1 and SW5 on and off when the temperature of the secondary battery 11 detected by the battery temperature detection unit 15 is equal to or lower than a set temperature, and a person has been detected to have sat in the driver's seat by the seat occupancy detection unit 4. According to these embodiments, there is the advantage that the switching elements SW1 and SW5 are operated only when it is necessary to raise the temperature of the secondary battery 11 and there is a high likelihood of the vehicle being used.

(Fifth Embodiment)

Figure 5:
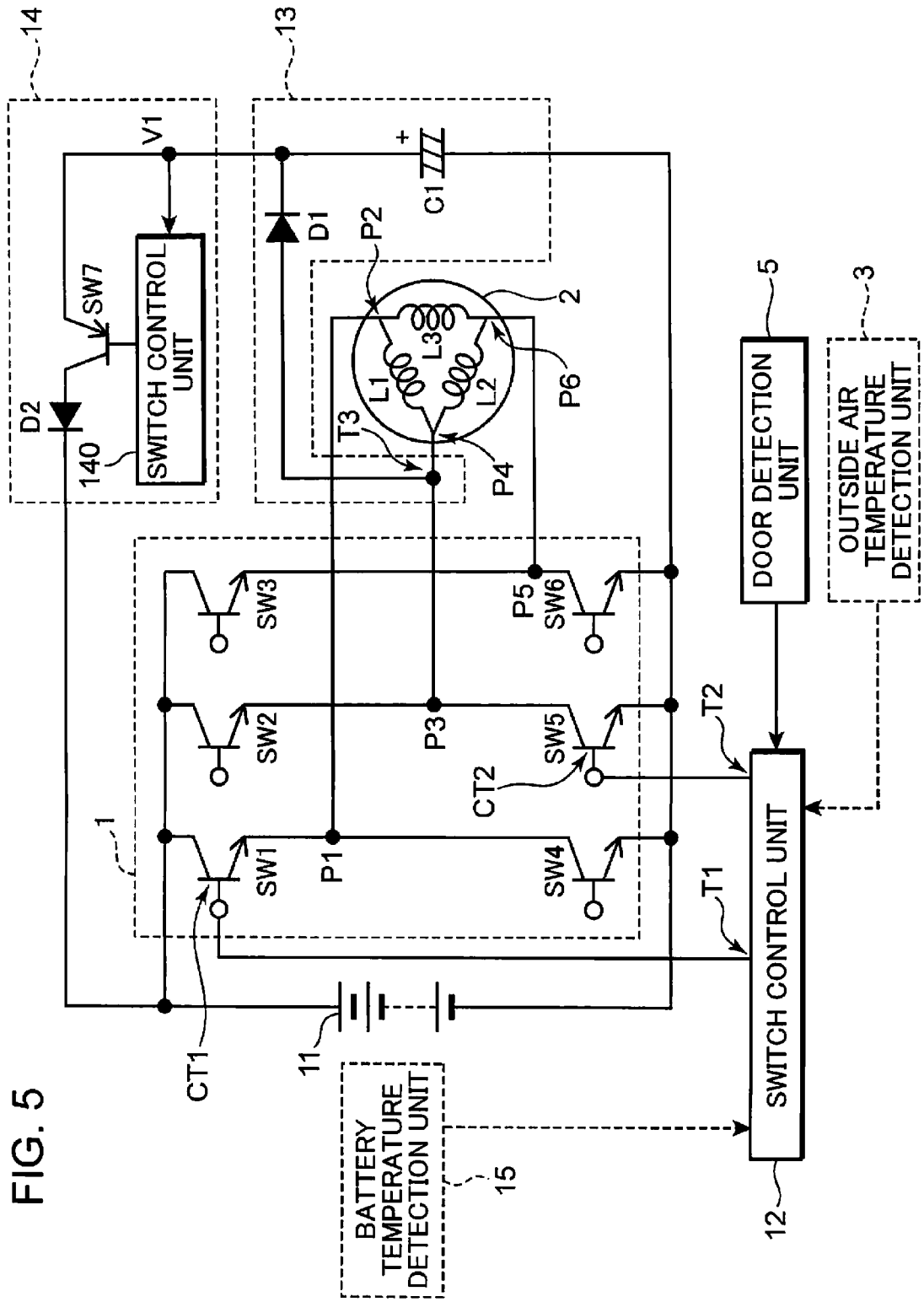
FIG. 5 is a circuit diagram showing the configuration of a vehicle equipped with a battery warming circuit of a fifth embodiment of the present invention.

FIG. 5 is a circuit diagram showing the configuration of a vehicle equipped with a battery warming circuit of a fifth embodiment of the present invention. Furthermore, the same reference symbols are used to indicate those constituents of the fifth embodiment that are the same as those of the first embodiment, and the description focuses only on those constituents that differ from the first embodiment.

A vehicle installed with the battery warming circuit of the fifth embodiment is equipped with a door detection unit 5, which detects that a locked door has been unlocked, in addition to the inverter circuit 1 and the 3-phase alternating current motor 2. Further, in the fifth embodiment, the switch control unit 12 is electrically connected to the door detection unit 5 installed in the vehicle, and starts the operation of turning the switching elements SW1 and SW5 on and off when detection has been made by the door detection unit 5 that a locked door has been unlocked.

As has been described above, according to this fifth embodiment, the switch control unit 12 starts the operation of turning the switching elements SW1 and SW5 on and off when it has been detected by the door detection unit 5 that a locked door has been unlocked. Here, there is a high likelihood of the vehicle being used when a locked door has been unlocked. Hence, according to this fifth embodiment, there is the advantage that the switching elements SW1 and SW5 are operated only when there is a high likelihood of the vehicle being used.

Furthermore, as indicated by a broken line in FIG. 5, a temperature detected by the outside air temperature detection unit 3 installed in the vehicle may also be used. Namely, the switch control unit 12 may be made to start the operation of turning the switching elements SW1 and SW5 on and off when the outside air temperature detected by the outside air temperature detection unit 3 has fallen to or below a set temperature and when it has been detected that a locked door has been unlocked by the door detection unit 5. In addition, as indicated by a broken line in FIG. 5, a temperature detected by the battery temperature detection unit 15 may also be used. Namely, the switch control unit 12 may be made to start the operation of turning the switching elements SW1 and SW5 on and off when the temperature of the secondary battery 11 detected by the battery temperature detection unit 15 is equal to or lower than a set temperature and when it has been detected that a locked door has been unlocked by the door detection unit 5. According to these embodiments, there is the advantage that the switching elements SW1 and SW5 are operated only when it is necessary to raise the temperature of the secondary battery 11 and there is a high likelihood of the vehicle being used.

(Sixth Embodiment)

Figure 6:
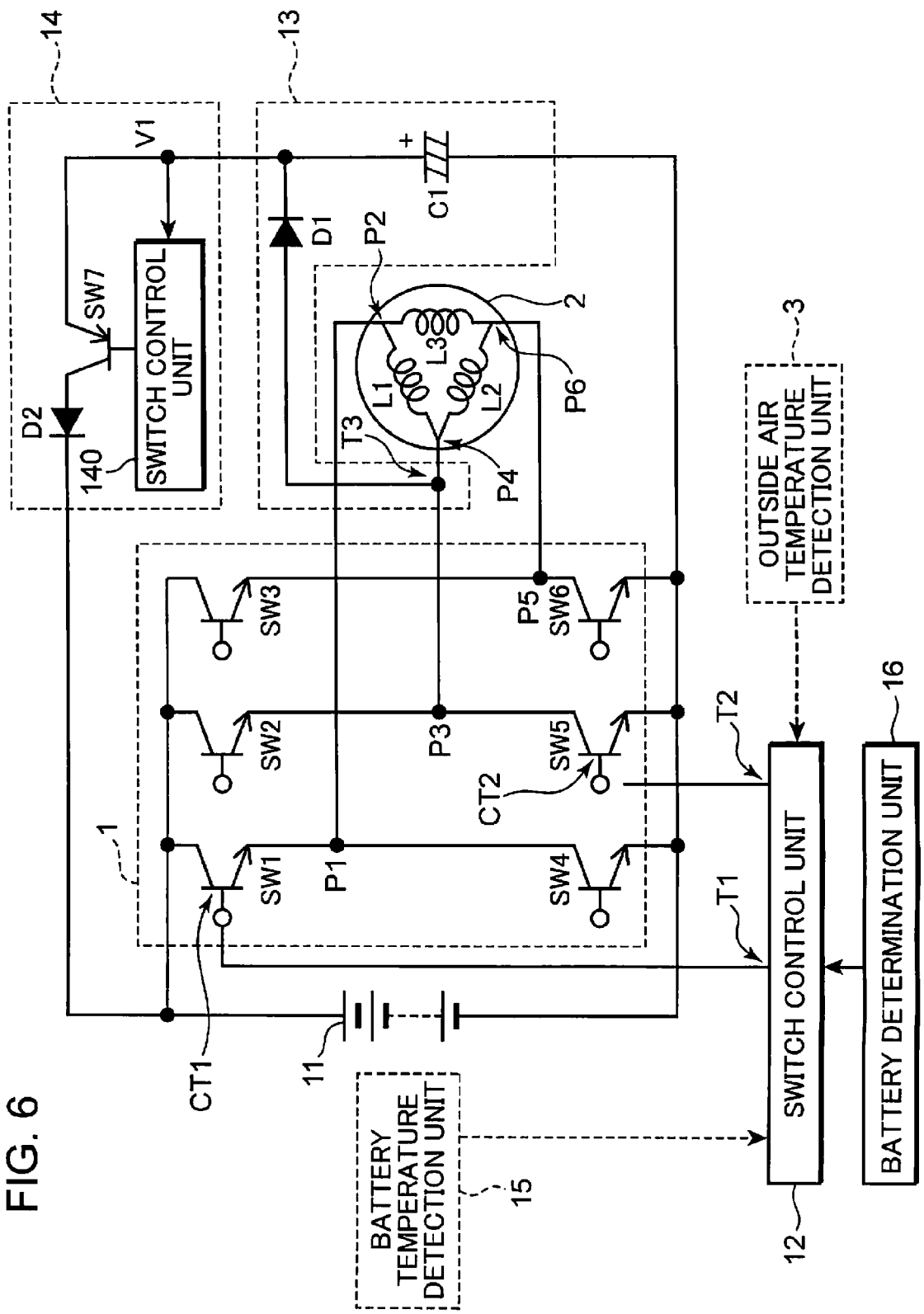
FIG. 6 is a circuit diagram showing the configuration of a vehicle equipped with a battery warming circuit of a sixth embodiment of the present invention.

FIG. 6 is a circuit diagram showing the configuration of a vehicle equipped with a battery warming circuit of a sixth embodiment of the present invention. Furthermore, the same reference symbols are used to indicate those constituents of the sixth embodiment that are the same as those of the first embodiment, and the description focuses only on those constituents that differ from the first embodiment.

In the sixth embodiment, the battery warming circuit is further provided with a battery determination unit 16. The battery determination unit 16 determines the charged state of the secondary battery 11 and notifies the result of that determination to the switch control unit 12. In addition, in the sixth embodiment, the switch control unit 12 starts the operation of turning the switching elements SW1 and SW5 on and off when the charged state of the secondary battery 11 determined by the battery determination unit 16 is equal to or greater than a set level which is set in advance.

As has been described above, in this sixth embodiment, the switch control unit 12 starts the operation of turning the switching elements SW1 and SW5 on and off when it has been determined by the battery determination unit 16 that the charged state of the secondary battery 11 is equal to or greater than a set level which is set in advance. Here, when charge-discharge current flows in the secondary battery 11 as a result of the operation of turning the switching elements SW1 and SW5 on and off, there is the risk of a decrease in the charged state of the secondary battery 11. Therefore, in this sixth embodiment, the switching elements SW1 and SW5 are operated only when the charged stage of the secondary battery 11 is equal to or greater than the set level. Thus, according to the sixth embodiment, it is possible to prevent the charged state of the secondary battery 11 from becoming excessively low.

Furthermore, as indicated by a broken line in FIG. 6, a temperature detected by the outside air temperature detection unit 3 installed in the vehicle may also be used. Namely, the switch control unit 12 may be made to only begin the operation of turning the switching elements SW1 and SW5 on and off when the outside air temperature detected by the outside air temperature detection unit 3 has fallen to or below a set temperature and when the charged state of the secondary battery 11 is equal to or greater than a set level. In addition, as indicated by a broken line in FIG. 6, a temperature detected by the battery temperature detection unit 15 may also be used. Namely, the switch control unit 12 may be made to begin the operation of turning the switching elements SW1 and SW5 on and off when the temperature of the secondary battery 11 detected by the battery temperature detection unit 15 is equal to or lower than a set temperature and when the charged state of the secondary battery 11 is equal to or greater than a set level. According to these embodiments, there is the advantage that the switching elements SW1 and SW5 are operated only when it is necessary to raise the temperature of the secondary battery 11 and the charged state of the secondary battery 11 is equal to or greater than the set level.

(Others)

Furthermore, although bipolar transistors are used for the switching elements SW1 to SW6 in each of the above-described embodiments, the present invention is not limited thereto. For example, other switching elements such as field effect transistors (FET) may also be used.

In addition, although the outside air detection unit 3 is used in FIGS. 3 to 6, the present invention is not limited to detecting outside air temperature. For example, a temperature corresponding to the temperature of the secondary battery 11 such as the temperature outside the vehicle may also be detected.

Furthermore, inventions having the configurations indicated below are mainly included in the specific embodiments previously described.

A battery warming circuit installed in a vehicle which is provided with an inverter circuit that converts direct current electrical power supplied from a secondary battery to 3-phase alternating current electrical power by switching a plurality of switching elements on and off, and a 3-phase alternating current motor that is driven by the inverter circuit, the battery warming circuit having: when one phase coil of three phase coils provided in the 3-phase alternating current motor is defined as a specific coil, one of the plurality of switching elements that is connected between one end of the specific coil and a positive electrode of the secondary battery is defined as a first switching element, and one of the plurality of switching elements that is connected between the other end of the specific coil and a negative electrode of the secondary battery is defined as a second switching element, a switch control unit which has a first terminal connected to a control terminal of the first switching element and a second terminal connected to a control terminal of the second switching element, and controls turning the first and second switching elements on and off by respectively outputting control signals to the control terminals of the first and second switching elements through the first and second terminals; an accumulation unit which has a third terminal connected to the other end of the specific coil, and accumulates back electromotive force generated in the specific coil by turning the second switching element on and off, with the first switching element being turned on, and a charging control unit which is provided between the positive electrode of the secondary battery and the accumulation unit, and supplies electrical power accumulated in the accumulation unit to the secondary battery.

According to this configuration, electrical power is supplied from the secondary battery to the specific coil when the first and second switching elements are on, and the secondary battery discharges. On the other hand, when the second switching element is switched from on to off, with the first switching element being turned on, back electromotive force is generated in the specific coil. The back electromotive force is accumulated in the accumulation unit. The electrical power accumulated in the accumulation unit is supplied to the secondary battery, and the secondary battery is charged. In this manner, charge-discharge current flows in the secondary battery. Since Joule heat is generated due to the internal resistance of the secondary battery as a result of this charge-discharge current, the temperature of the secondary battery is raised by this Joule heat. Thus, the secondary battery can be warmed without driving the engine of the vehicle. In addition, since Joule heat of internal resistance is used instead of heating with a heater from the outside, the temperature of the secondary battery can be raised efficiently.

Further, in the above-described battery warming circuit, a temperature detection unit is preferably provided that detects a temperature of the secondary battery, and the switch control unit preferably starts turning the first and second switching elements on and off when a temperature detected by the temperature detection unit has fallen to or below a set temperature which is set in advance.

According to this configuration, since the temperature of the secondary battery is detected and turning the first and second switching elements on and off is started when the detected temperature has fallen to or below the set temperature, the secondary battery is warmed only when it is necessary to raise the temperature of the secondary battery.

Further, the battery warming circuit is preferably installed in a vehicle which is provided with a temperature detection unit that detects a temperature outside the vehicle, and the switch control unit preferably starts turning the first and second switching elements on and off when a temperature detected by the temperature detection unit has fallen to or below a set temperature which is set in advance.

According to this configuration, since a temperature outside the vehicle is detected and turning the first and second switching elements on and off is started when the detected temperature has fallen to or below the set temperature, the secondary battery can be warmed only when it is necessary to raise the temperature of the secondary battery.

Further, the battery warming circuit is preferably installed in a vehicle which is provided with a seat occupancy detection unit that detects that a person has sat in a driver's seat, and the switch control unit preferably starts turning the first and second switching elements on and off when detection has been made by the seat occupancy detection unit that a person has sat in the driver's seat.

It is considered to be highly likely that the vehicle is being used when a person sits in the driver's seat. Therefore, according to this configuration, since turning the first and second switching elements on and off is started when a person has been detected to have sat in the driver's seat, the secondary battery can be warmed only when there is a high likelihood of the vehicle being used.

Further, the battery warming circuit is preferably installed in a vehicle which is provided with a door detection unit that detects that a locked door has been unlocked, and the switch control unit preferably starts turning the first and second switching elements on and off when detection has been made by the door detection unit that a locked door has been unlocked.

It is considered to be highly likely that the vehicle is being used when a locked door is unlocked. Therefore, according to this configuration, since turning the first and second switching elements on and off is started when it has been detected that a locked door has been unlocked, the secondary battery can be warmed only when there is a high likelihood of the vehicle being used.

Further, in the above-described battery warming circuit, a battery determination unit that determines a charged state of the secondary battery is preferably further provided, and the switch control unit preferably starts turning the first and second switching elements on and off when the charged state of the secondary battery determined by the battery determination unit is equal to or greater than a set level which is set in advance.

According to this configuration, since turning the first and second switching elements on and off is started when the charged stage of the secondary battery is equal to or greater than the set level, a decrease in the charged state of the secondary battery from the set level can be avoided by charging and discharging to warm the secondary battery.

Further, in the above-described battery warming circuit, the charging control unit preferably detects a voltage of the accumulation unit, and preferably starts supplying electrical power accumulated in the accumulation unit to the secondary battery when a detected voltage is equal to or greater than a set level which is set in advance.

According to this configuration, since the supply of electrical power accumulated in the accumulation unit to the secondary battery is started when the voltage of the accumulation unit is equal to or greater than the set level, charge current can be reliably flowed to the secondary battery.

Further, a battery warming apparatus according to another aspect of the present invention includes the above-described battery warming circuit and the secondary battery that supplies direct current electrical power to the inverter circuit. According to this configuration, similar operation is performed and similar advantageous effects can be obtained as the above-described battery warming circuit.

According to the present invention, by switching on and off first and second switching elements connected to one phase coil of three phase coils provided in a 3-phase alternating current motor, charge-discharge current flows in a secondary battery, and since Joule heat is generated due to internal resistance of the secondary battery as a result of this charge-discharge current, the temperature of the secondary battery is raised by this Joule heat. Thus, the secondary battery can be warmed without driving the engine of a vehicle.

Industrial Applicability

The battery warming circuit and battery warming apparatus according to the present invention can be installed and preferably used in a vehicle such as an electric vehicle or a hybrid vehicle provided with an inverter circuit, which converts direct current electrical power supplied from a secondary battery to 3-phase alternating current electrical power by switching a plurality of switching elements on and off, and a 3-phase alternating current motor, which is driven by the inverter circuit.

The invention claimed is:

1. A battery warming circuit installed in a vehicle which is provided with an inverter circuit that converts direct current electrical power supplied from a secondary battery to 3-phase alternating current electrical power by switching a plurality of switching elements on and off, and a 3-phase alternating current motor that is driven by the inverter circuit, the battery warming circuit comprising:

when one phase coil of three phase coils provided in the 3-phase alternating current motor is defined as a specific coil, one of the plurality of switching elements that is connected between one end of the specific coil and a positive electrode of the secondary battery is defined as a first switching element, and one of the plurality of switching elements that is connected between the other end of the specific coil and a negative electrode of the secondary battery is defined as a second switching element, a switch control unit which has a first terminal connected to a control terminal of the first switching element and a second terminal connected to a control terminal of the second switching element, and controls turning the first and second switching elements on and off by respectively outputting control signals to the control terminals of the first and second switching elements through the first and second terminals;

an accumulation unit which has a third terminal connected to the other end of the specific coil, and accumulates back electromotive force generated in the specific coil by turning the second switching element on and off, with the first switching element being turned on; and a charging control unit which is provided between the positive electrode of the secondary battery and the accumulation unit, and supplies electrical power accumulated in the accumulation unit to the secondary battery.

2. The battery warming circuit according to claim 1, comprising a temperature detection unit that detects a temperature of the secondary battery, wherein the switch control unit starts turning the first and second switching elements on and off when a temperature detected by the temperature detection unit has fallen to or below a set temperature which is set in advance.

3. The battery warming circuit according to claim 1, installed in a vehicle which is provided with a temperature detection unit that detects a temperature outside the vehicle, wherein
the switch control unit starts turning the first and second switching elements on and off when a temperature detected by the temperature detection unit has fallen to or below a set temperature which is set in advance.

4. The battery warming circuit according to claim 1, installed in a vehicle which is provided with a seat occupancy detection unit that detects that a person has sat in a driver's seat, wherein
the switch control unit starts turning the first and second switching elements on and off when detection has been made by the seat occupancy detection unit that a person has sat in the driver's seat.

5. The battery warming circuit according to claim 1, installed in a vehicle which is provided with a door detection unit that detects that a locked door has been unlocked, wherein
the switch control unit starts turning the first and second switching elements on and off when detection has been made by the door detection unit that a locked door has been unlocked.

6. The battery warming circuit according to claim 1, further comprising a battery determination unit that determines a charged state of the secondary battery, wherein
the switch control unit starts turning the first and second switching elements on and off when the charged state of the secondary battery determined by the battery determination unit is equal to or greater than a set level which is set in advance.

7. The battery warming circuit according to claim 1, wherein
the charging control unit detects a voltage of the accumulation unit, and starts supplying electrical power accumulated in the accumulation unit to the secondary battery when a detected voltage is equal to or greater than a set level which is set in advance.

8. A battery warming apparatus, comprising:
the battery warming circuit according to claim 1; and
the secondary battery that supplies direct current electrical power to the inverter circuit.

* * * * *